US012225954B2

(12) United States Patent
Rothenberg

(10) Patent No.: US 12,225,954 B2
(45) Date of Patent: Feb. 18, 2025

(54) POROUS SOUND ABSORBER ACOUSTIC FACE MASK APPARATUS

(71) Applicant: Acoustic Mask LLC, Kensington, MD (US)

(72) Inventor: Martin Rothenberg, Jamesville, NY (US)

(73) Assignee: Acoustic Mask LLC, Kensington, MD (US)

( * ) Notice: Subject to any disclaimer, the term of this patent is extended or adjusted under 35 U.S.C. 154(b) by 180 days.

(21) Appl. No.: 17/246,695

(22) Filed: May 2, 2021

(65) Prior Publication Data

US 2022/0047011 A1 Feb. 17, 2022

Related U.S. Application Data

(63) Continuation of application No. 16/994,649, filed on Aug. 16, 2020, now Pat. No. 11,019,859.

(51) Int. Cl.
*A41D 13/11* (2006.01)
*G10K 11/16* (2006.01)

(52) U.S. Cl.
CPC .......... *A41D 13/1107* (2013.01); *G10K 11/16* (2013.01)

(58) Field of Classification Search
CPC ............................ A41D 13/1107; G10K 11/16
See application file for complete search history.

(56) References Cited

U.S. PATENT DOCUMENTS

| | | | | |
|---|---|---|---|---|
| 4,362,825 A * | 12/1982 | Grabhoefer | C08G 18/4241 521/173 |
| 4,862,503 A | 8/1989 | Rothenberg | |
| 4,909,261 A | 3/1990 | Rothenberg | |
| 5,454,375 A | 10/1995 | Rothenberg | |
| 5,717,828 A | 2/1998 | Rothenberg | |
| 6,134,529 A | 10/2000 | Rothenberg | |
| 6,358,054 B1 | 3/2002 | Rothenberg | |
| 6,850,882 B1 | 2/2005 | Rothenberg | |
| 8,423,368 B2 | 4/2013 | Rothenberg | |
| 9,437,116 B2 | 9/2016 | Rothenberg | |
| 10,646,731 B2 * | 5/2020 | Jayaraman | A62B 9/04 |
| 10,798,979 B2 * | 10/2020 | Hosmer | A62B 23/025 |
| 10,827,787 B2 * | 11/2020 | Facer | A62B 23/025 |
| 11,019,859 B1 * | 6/2021 | Rothenberg | A41D 13/1107 |
| 2011/0082697 A1 | 4/2011 | Rothenberg | |

(Continued)

OTHER PUBLICATIONS

Tang, Acoustic energy absorption, Jul. 2017, https://www.sciencedirect.com/science/articles/pii/S1359835X17302609.*

(Continued)

*Primary Examiner* — Forrest M Phillips

(57) ABSTRACT

An acoustic face mask reduces the distortion and muffling of speech sounds by a face mask wall. The distortion and muffling of speech sounds by a face mask wall may be reduced by reducing the acoustic coupling of the vocal tract and/or nasal cavity to the face mask chamber, which causes a reduction in the intelligibility of the speech. The acoustic coupling of the vocal tract and/or nasal cavity to the face mask chamber may be reduced, for example, by reducing the reflected sound energy caused by the face mask wall. For example, one or more sound absorbing members or acoustically transparent members reduce the reflected sound energy caused by the face mask wall.

22 Claims, 14 Drawing Sheets

(56) References Cited

U.S. PATENT DOCUMENTS

| | | | | |
|---|---|---|---|---|
| 2017/0209720 | A1* | 7/2017 | Mingo | A62B 23/025 |
| 2018/0000173 | A1* | 1/2018 | Tsaur | G10K 11/24 |
| 2019/0021993 | A1* | 1/2019 | Green | A61M 16/0666 |
| 2019/0053550 | A1* | 2/2019 | Abdo | A41D 13/1161 |
| 2020/0329792 | A1* | 10/2020 | Howard | A41D 13/11 |

OTHER PUBLICATIONS

Sondhi, M. M. (1975). Measurement of the glottal waveform. The Journal of the Acoustical Society of America, 57(1), 228-232.

Hillenbrand, J. M. (2011). Acoustic Analysis of Voice: A Tutorial. Perspectives on Speech Science and Orofacial Disorders, 21(2), 31-43.

Palmiero, A. J., Symons, D., Morgan, J. W., Shaffer, R. E. (2016). Speech intelligibility assessment of protective facemasks and air-purifying respirators. Journal of Occupational and Environmental Hygiene, 13(12), 960-968.

Rothenberg, M. (1973). A new inverse-filtering technique for deriving the glottal air flow waveform during voicing. The Journal of the Acoustical Society of America, 53(6), 1632-1645.

Van Cott, H.P., Kinkade, R. G. (1972). Human engineering guide to equipment design, Chapter 5. Washington: Dept. of Defense; for sale by the Supt. of Docs., U.S. Govt. Print. Off.

Zhao, H., Sun, X. (1999). Active control of wall acoustic impedance. AIAA Journal, 37, 825-831.

Peterson, G. E., Barney, H. L. (1951). Control Methods Used in a Study of the Vowels. The Journal of the Acoustical Society of America, 23(1).

Miller, D. G., Sulter, A. M., Schutte, H. K., Wolf, R. F. (1997). Comparison of vocal tract formants in singing and honperiodic phonation. Journal of Voice, 11(1), 1-11 (1997).

Nicolas Sturmel, Christophe d'Alessandro, Boris Doval (2006). A Spectral Method for Estimation of the Voice Speed Quotient and Evaluation Using Electroglottography.

Radonovich, L. J., Yanke, R., Cheng, J., Bender, B. (2009). Diminished Speech Intelligibility Associated with Certain Types of Respirators Worn by Healthcare Workers. Journal of Occupational and Environmental Hygiene, 7(1), 63-70.

Liu, Z., Zhang, X., Mao, Y., Zhu, Y. Y., Yang, Z., Chan, C.T., and Sheng, P., (2000) Locally Resonant Sonic Materials. Science, 289 (5485), pp. 1734-1736 (2000).

Liu, Z., Zhan, J., Fard, M., Davy, J. L. (2017). Acoustic properties of multilayer sound absorbers with a 3D printed micro-perforated panel. Applied Acoustics, 121, 25-32.

Martin Rothenberg and Harm K. Schutte (2015). Interactive Augmentation of Voice Quality and Reduction of Breath Airflow in the Soprano Voice. Journal of Voice, 30 (6).

Michal Borsky, Daryush D. Mehta, Julius P. Gudjohnsen, Jon Gudnason (2016). Classification of Voice Modality using Electroglottogram Waveforms. Interspeech 2016, 3166-70.

Mark R. P. Thomas, Jon Gudnason, Patrick A. Naylor (2012). Estimation of Glottal Closing and Opening Instants in Voiced Speech Using the YAGA Algorithm. IEEE Transactions On Audio, Speech, and Language Processing, 20 (1).

Joao P. Cabral (2018). Estimation of the asymmetry parameter of the glottal flow waveform using the electroglottographic signal. Interspeech 2018, pp. 2997-3001.

Nathalie Henrich, Christophe d'Alessandro, Boris Doval, Miche'le Castellengo (2004). On the use of the derivative of electroglottographic signals for characterization of nonpathological phonation. J. Acoust. Soc. Am. 115 (3).

Martin Rothenberg (1992). A Multichannel Electroglottograph. Journal of Voice, 6(1), pp. 36-43.

Pabst, F. and Sundberg, J. (1992). Tracking Multi-Channel Electrogloitograph Measurement of Larynx Height in Singers, STL-QPSR No. 1, pp. 67-78.

Hertegard, S. and Gauffin, J. (1992). Acoustic properties of the Rothenberg mask. STL-QPSR No. 2-3, pp. 9-18.

Badin, P., Hertegard, S., & Karlsson, I. (1990): "Notes on the Rothenberg mask," STL-QPSR No. 1, pp. 1-7.

Martin Rothenberg (2014). Rethinking The Interpolation Method For Estimating Subglottal Pressure.

Martin Rothenberg (2009). Voice Onset Time vs. Articulatory Modeling for Stop Consonants. Journal Logopedics Phoniatrics Vocology, vol. 34, 171-180.

Stefan Auberg, Nelson Correa, Martin Rothenberg, Mark Shanahan (1998). Vowel and Intonation Training in an English Pronunciation Tutor (1998). ETRW on Speech Technology in Language Learning, Marholmen, Sweden.

Prathosh A. P., Sujith P, Ramakrishnan A. G., Prasanta Kumar Ghosh (2016). Cumulative Impulse Strength for Epoch Extraction. IEEE Signal Processing Letters, 23(4).

Martin Rothenberg (1984). Source-Tract Acoustic Interaction and Voice Quality. Transcripts of the Twelfth Symposium: Care of the Professional Voice, The Julliard School, New York City, Jun. 6-10, 1983, The Voice Foundation, New York, NY, pp. 15-31.

M. Rothenberg, and R. T. Verrillo (1976). Vibrotactile frequency for encoding speech parameters. The Journal of the Acoustical Society of America 59, S69 (1976).

Martin Rothenberg (2014). Rethinking Nasalance and Nasal Emission.

Stephen A. Zahorian, Martin Rothenberg (1981). Principal-Components Analysis for Low-Redundancy Encoding of Speech Spectra. The Journal of the Acoustical Society of America 69, 832.

* cited by examiner

POROUS SOUND ABSORBER ACOUSTIC FACE MASK APPARATUS

CROSS REFERENCE TO RELATED APPLICATION

This application is a continuation of U.S. patent application Ser. No. 16/994,649 entitled "Acoustic Face Mask Apparatus" filed Aug. 16, 2020, which is incorporated herein by reference in its entirety.

BACKGROUND OF THE INVENTION

1. Field of the Invention

The invention relates to face masks, and particularly to face masks that reduce distortion and muffling of the speech.

2. Description of the Related Technology

Face masks (or "masks") are any protective coverings that cover the mouth and nose of the user. Other types of face masks additionally cover the eyes, or just the nose and eyes. There are a number of situations in which it is necessary to filter the air entering or exiting the mouth and nose. Accordingly, there are a number of different kinds of face masks, depending on the application.

One type of face mask is the respirator, also known as a "mechanical filter respirator," "filtering facepiece respirator," "surgical/medical/healthcare respirator" and the like (all herein referred to as "respirators"). Respirators are designed to protect the user from inhaling hazardous atmospheres, including airborne pathogens, fumes, vapours, gases, or any particulate matter (such as dusts). One common respirator is the N95 mask, meets the U.S. National Institute for Occupational Safety and Health (NIOSH) N95 classification of air filtration, meaning that it filters at least 95% of airborne particles (particulate matter). The N95 mask requires a fine mesh of synthetic polymer fibers, specifically a nonwoven polypropylene fabric, and is produced by melt blowing and forms the inner filtration layer that filters out hazardous particles. Respirators, such as N95 respirators are common for industrial use, such as N95 respirators that were originally designed for industrial use in sectors such as mining, construction, painting, and nanotechnology. Respirators are also common in healthcare. In the United States, the Occupational Safety and Health Administration (OSHA) requires healthcare workers performing activities with those suspected or confirmed to be infected with COVID-19 to wear respiratory protection, such as an N95 respirator, and the CDC recommends the use of respirators with at least N95 certification to protect the wearer from inhalation of infectious particles including *Mycobacterium tuberculosis*, avian influenza, severe acute respiratory syndrome (SARS), pandemic influenza, and Ebola.

Another type of face mask is the surgical mask. A surgical mask is a loose-fitting, disposable device that creates a physical barrier between the mouth and nose of the wearer and potential contaminants in the immediate environment. If worn properly, a surgical mask is meant to help block large-particle droplets, splashes, sprays, or splatter that may contain viruses and bacteria. Surgical masks may also help reduce exposure of the wearer's saliva and respiratory secretions to others.

Another type of mask is the cloth face mask. Cloth face masks are made of common fabrics, textiles, usually cotton, worn over the mouth and nose. Although they are less effective than surgical masks or N95 masks, they are used by the general public in household and community settings as perceived protection against both infectious diseases and particulate air pollution. For these reasons, cloth face masks are generally recommended by public health agencies only for disease source control in epidemic situations. Cloth masks may be made from materials as simple as cotton, and may be fashioned from common clothing materials, such as from a shirt or bandana. Cloth masks may also be formed of polymers for more specific applications.

Another type of face mask is the self-contained breathing apparatus ("SCBA"), which are worn to provide breathable air in an atmosphere that is immediately dangerous to life or health atmosphere. These face masks are most often worn by firefighters, in industry, in underwater uses, and other applications. SCBAs designed for underwater use are typically referred to as designed for use under water, it is also known as a SCUBA (self-contained underwater breathing apparatus) masks. The term "SCBA" as used here includes "SCUBA," unless otherwise noted. The term "self-contained" means that the SCBA is not dependent on a remote supply of breathing gas (e.g., through a long hose). Instead, SCBAs typically have three components: a high-pressure tank, a pressure regulator, and a face mask. While the term "SCBA" would typically refer to the system comprising face mask, high-pressure tank, and pressure regulator, the terms as used here refer to only the face mask, and the terms "SCBA set" refers to the complete system. SCBA sets fall into one of two categories: open-circuit or closed-circuit. Open-circuit SCBA sets are filled with filtered, compressed air, rather than pure oxygen. Typical open-circuit systems have two regulators; a first stage to reduce the pressure of air to allow it to be carried to the mask, and a second stage regulator to reduce it even further to a level just above standard atmospheric pressure. This air is then fed to the mask via either a demand valve (activating only on inhalation) or a continuous positive pressure valve (providing constant airflow to the mask). Open-circuit SCUBA sets allow the diver to inhale from the equipment, and all the exhaled gas is exhausted to the surrounding water. This type of equipment is relatively simple, economical and reliable.

The closed-circuit type, also known as a rebreather, operates by filtering, supplementing, and recirculating exhaled gas. It is used when a longer-duration supply of breathing gas is needed, such as in mine rescue and in long tunnels, and going through passages too narrow for a big open-circuit air cylinder. Closed-circuit (or semi-closed circuit) SCUBA sets allow the diver to inhale from the set, and exhales back into the set, where the exhaled gas is processed to make it fit to breathe again. This equipment is efficient and quiet.

Regardless of the type, SCBAs are typically "fullface masks" which are also known as "fullface respirators." Fullface masks cover the entire face or substantially the entire face. Fullface masks are used when the hazard can penetrate through or irritate skin or eyes, such as common in firefighting, several industries requiring the use of hazardous chemicals, toxic cleanup, military, and underwater diving. SCBAs are typically "hard-walled," e.g., made from a plastic, rubber, soft silicone, tempered glass, or the like. SCBAs for firefighting applications are additionally confined to heat-resistant materials.

Other types of face masks include oxygen masks (a piece of medical equipment that assists breathing by providing a method to transfer breathing oxygen gas from a storage tank to the lungs), anesthetic masks, dust masks, burn masks (a piece of medical equipment that protects the burn tissue from contact with other surfaces, and minimizes the risk of infection), masks that protect against weather (such as ski masks), face shields, protective masks (as worn by law enforcement and military personnel), gas masks, and welding masks. The above described masks are not an exhaustive list and is provided for illustrative purposes only. Other types of masks, including combinations and variations of the above described masks, are commonly known and are equally applicable to the present invention.

Face masks allow varying amounts of air to pass through the wall of the mask. Face masks that allow little to no air to pass (for example, SCBAs and gas masks, in the extreme case) often include a ventilation valve, also commonly referred to as an exhalation valve, ventilation hole, voice or speaking diaphragm, or the like. This is because the face mask does not allow enough air to pass through the mask wall to allow the user to breathe sufficiently. A filter is often included within the ventilation valve. As used herein, the term ventilation valve means any valve, hole, opening, or the like, that allows the user to better breathe (either exhaling, inhaling, or both).

As described herein, the term "air impervious" is used to refer to a face mask wall material that allows little to no air to pass and therefore requires a ventilation valve. Such materials include, but are not limited to, rubbers and hard plastics. Of course, a material may be air impervious and not require a ventilation valve if the mask wall is not tight-fitting or otherwise allows air to pass around the edges of the face mask wall. For example, a loose-fitting mask will usually allow sufficient intake of air such that a ventilation valve is not needed, even when an air impervious mask wall material is used. As another example, face shields provide another exception because the chamber formed by face shields typically allow air to pass around the edges of the face shield wall (face shields typically provide protection from airborne pathogens despite allowing air to pass around its perimeter by providing fullface protection). Thus, face shield walls are typically comprised of an air impervious material (such as a hard plastic), and yet do not usually require a ventilator. The term "air transmissive" is used to refer to a face mask wall material that does not require a ventilation valve for the user to sufficiently breathe because the material of the mask wall sufficiently allows air to pass. For example, N95 respirators and face masks made of textiles are non-limiting example of materials that allow air to pass through the face mask wall.

One common problem associated with face masks is that they distort and muffle the speech of the user. This distortion and muffling can reduce the ability of the user to communicate. For example, healthcare workers are often required to effectively communicate and wear a face mask simultaneously. Healthcare workers may be hindered in performing their duties if they are not effectively able to communicate, and personnel in other industries are similarly affected. Furthermore, outbreaks of airborne pathogens may cause governmental bodies to mandate or require people to wear face masks in public. Employers may also implement such measures. In these cases, large numbers of people may be communicating while wearing face masks, such as at work, restaurants, retail stores, on public transportation, and at public and private events or gatherings, for example. In these situations, it is common for the speech distortion of the face masks to cause the wearer to remove the face mask while speaking, eliminating the purpose of the face mask by allowing unfiltered air to enter and exit the mouth of the user, potentially worsening the spread of the pathogen.

Recently, the effect of face masks on speech was quantified for several face masks used by heathcare workers. See Palmiero, Andrew J., et al. "Speech Intelligibility Assessment of Protective Facemasks and Air-Purifying Respirators." *Journal of Occupational and Environmental Hygiene*, vol. 13, no. 12, 2016, pp. 960-968. This study measured speech intelligibility ("SI"), which is the perceived quality of sound transmission, with users wearing a face mask. The results showed that all face masks exhibited SI interference. For example, N95 face masks (for example, the 3M 1870 and 3M 1860) showed SI interference typically differing from baseline by 13% and 17%, respectively, for models tested.

In many applications of face masks, distortion and muffling of the speech caused by the presence of the face mask can have a significant deleterious effect on speech intelligibility. See Radonovich, Lewis J., et al. "Diminished Speech Intelligibility Associated with Certain Types of Respirators Worn by Healthcare Workers." *Journal of Occupational and Environmental Hygiene*, vol. 7, no. 1, 2009, pp. 63-70.

Thus, there is a need for face masks that reduce the distortion and muffling of speech of the user.

All publications, patents, and patent applications mentioned in this specification are herein incorporated by reference to the same extent as if each individual publication, patent, or patent application was specifically and individually indicated to be incorporated by reference.

SUMMARY OF THE INVENTION

The present inventor recognized that there is a need for face masks that reduces the distortion and muffling of speech of the user. In particular, the present inventor recognized that the distortion and muffling caused by a face mask may be due to the coupling of the vocal tract and/or nasal cavity to the face mask chamber, which causes a reduction in the intelligibility of the speech. Furthermore, the present inventor recognized that the acoustic coupling of the vocal tract and/or nasal cavity to the face mask chamber may be recognized by changes in one or more formant structures of the speech when a face mask is worn compared to when no face mask is worn.

Accordingly, an advantageous feature of the invention is to reduce the distortion and muffling of speech caused by a face mask. This and other objects are addressed by the present invention, which provides an acoustic face mask.

An acoustic face mask reduces the distortion and muffling of speech sounds by a face mask wall. The distortion and muffling of speech sounds by a face mask wall may be reduced by reducing the acoustic coupling of the vocal tract and/or nasal cavity to the face mask chamber, which causes a reduction in the intelligibility of the speech. The acoustic coupling of the vocal tract and/or nasal cavity to the face mask chamber may be reduced, for example, by reducing the reflected sound energy caused by the face mask wall. For example, absorbing members and acoustically transparent members reduce the reflected sound energy caused by the face mask wall.

According to one embodiment, an acoustic face mask may comprise an air transmissive face mask wall configured to cover at least a person's mouth and a sound absorbing member connected to said air transmissive face mask wall.

According to another embodiment, an acoustic face mask may comprise an air impervious face mask wall configured to cover at least a person's mouth, a ventilation valve connected to said air impervious face mask wall, and a sound absorbing member connected to said air impervious face mask wall.

According to another embodiment, an acoustic face mask may comprise an air transmissive face mask wall configured to cover at least a person's mouth and a sound transparent member connected to said air transmissive face mask wall.

Various objects, features, aspects, and advantages of the present invention will become more apparent from the following detailed description of preferred embodiments of the invention, along with the accompanying drawings in which like numerals represent like components.

Moreover, the above objects and advantages of the invention are illustrative, and not exhaustive, of those that can be achieved by the invention. Thus, these and other objects and advantages of the invention will be apparent from the description herein, both as embodied herein and as modified in view of any variations which will be apparent to those skilled in the art.

DETAILED DESCRIPTION OF THE PREFERRED EMBODIMENT

Figure 1:
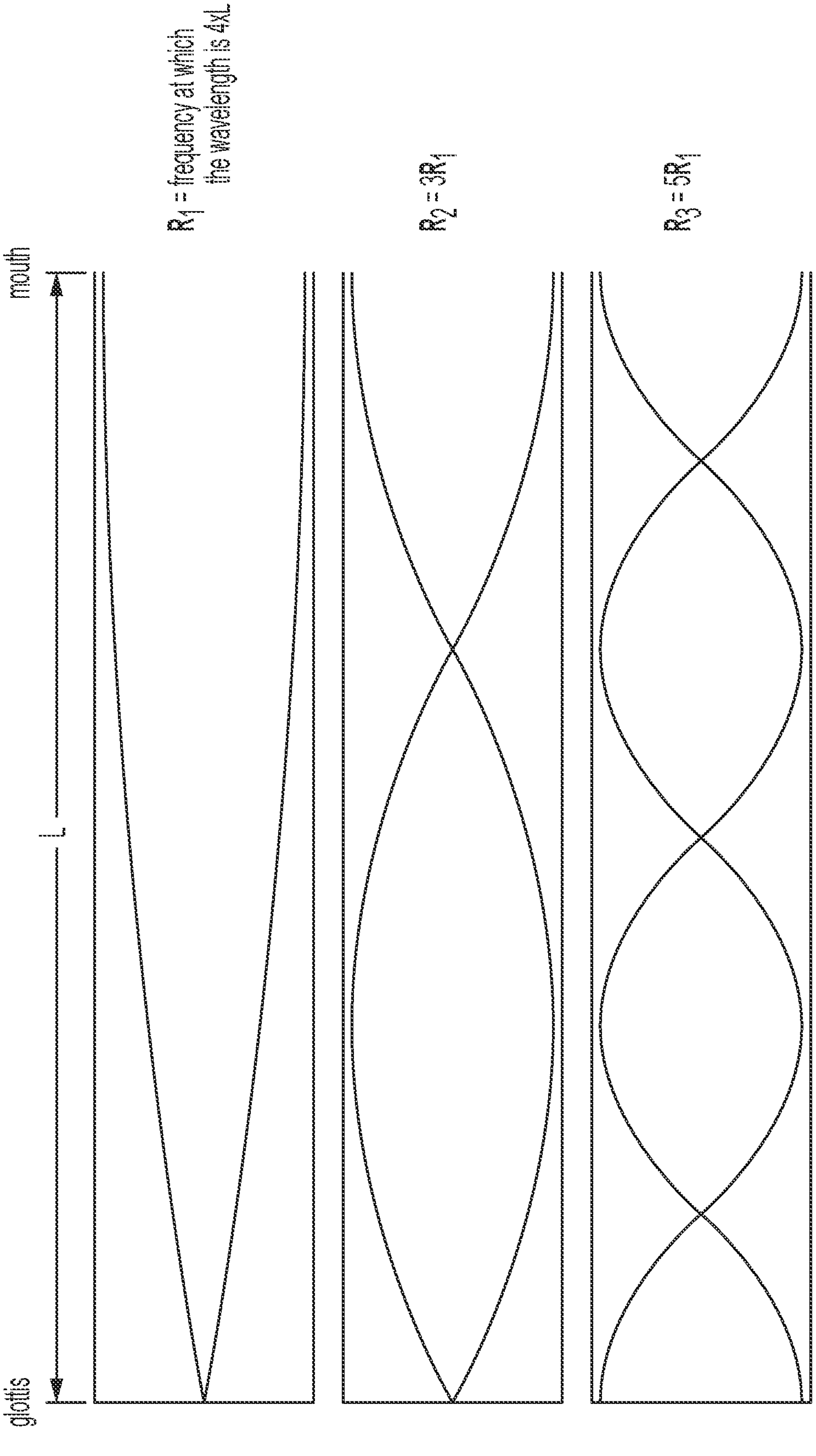
FIG. 1 shows a waveguide modelling the vocal tract.

Before the present invention is described in further detail, it is to be understood that the invention is not limited to the particular embodiments described, as such may, of course, vary. It is also to be understood that the terminology used herein is for the purpose of describing particular embodiments only, and is not intended to be limiting, since the scope of the present invention will be limited only by the appended claims.

Where a range of values is provided, it is understood that each intervening value between the upper and lower limit of that range and any other stated or intervening value in that stated range is encompassed within the invention. Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, a limited number of the exemplary methods and materials are described herein.

It must be noted that as used herein and in the appended claims, the singular forms "a," "an," and "the" include plural referents unless the context clearly dictates otherwise.

All publications mentioned herein are incorporated herein by reference to disclose and describe the methods and/or materials in connection with which the publications are cited. The publications discussed herein are provided solely for their disclosure prior to the filing date of the present application. Nothing herein is to be construed as an admission that the present invention is not entitled to antedate such publication by virtue of prior invention. Further, the dates of publication provided may be different from the actual publication dates, which may need to be independently confirmed.

The invention is described in detail with respect to preferred embodiments, and it will now be apparent from the foregoing to those skilled in the art that changes and modifications may be made without departing from the invention in its broader aspects, and the invention, therefore, as defined in the claims, is intended to cover all such changes and modifications that fall within the true spirit of the invention.

The acoustic characteristics of speech can be modelled as a sound source, vocal tract filter, and radiation characteristics.

In voiced sounds, the sound source is due to the vibrating vocal folds. The energy of the sound source usually comes from air expelled from the lungs, and at the larynx (or "voice box"), this flow of air passes between the vocal folds.

The shape of the vocal tract is modelled as the vocal tract filter, and is usually modelled separately from the vocal source. The vocal tract is usually measured from the glottis to the mouth, but can also include the nasal cavity, depending upon whether the velum is open or closed. For example, the nasal sounds such as /m/, /n/, and /ng/ require added resonance in the nasal cavity.

When speech is voiced, the vocal folds vibrate, effectively producing sound waves. Articulators, such as the tongue, teeth, pharynx, jaw and lips, modify the spectrum of those sound waves. Radiation characteristics refer to the way in which sound as a speech pressure waveform radiates from the mouth. Sound production that involves moving the vocal folds close together is called glottal. Voiced (e.g., quasiperiodic) source sounds are glottal, in addition to whisper (e.g., aperiodic). On the other hand, supra-glottal sound sources in speech are aperiodic (i.e., random noise or impulses).

The acoustic resonances in the vocal tract produce peaks in the spectral envelope of the output sound. Thus, the vocal tract is an acoustic filter, and the resonances of the vocal tract produce spectral peaks or formants in the output sound. The term "formant," as used in the art, is used to describe either a spectral peak or a resonance that gives rise to it. An acoustic filter selectively attenuates certain frequencies and allows other frequencies to pass through unattenuated.

The resonances of the vocal tract can be modelled as an acoustic waveguide, typically having a length of about 10-20 cm. The cross section along the length of the waveguide is varied by the geometry of the articulators. The frequencies of the resonances depend upon the shape. The frequencies of the first, second, third and ith resonances are called $R_1$, $R_2$, $R_3$ . . . , $R_i$ . . . . As shown in FIG. 1, the waveguide modelling the vocal tract is accurately described as open at one end (representing the mouth), and closed at the other end (representing the glottis). To understand the basis of the resonant frequencies of the vocal tract and see the approximate values to be expected for these resonance frequencies, we illustrate in FIG. 1 that if the cross-sectional area of a tube closed at one end and open at the other end is constant over the length of the tube, standing waves for the lowest three resonant frequencies would be as in FIG. 1. For a linearized vocal tract length the size of that of a typical adult, the lowest resonant frequency $R_1$ would be approximately 500 Hz. $R_2$ and $R_3$ would be 3 and 5 times that value and approximately 1500 Hz and 2500 Hz, respectively.

During the voicing of vowels, the periodic movement of the glottis is negligible compared to the opening at the lips, so it is effectively treated as closed. The articulators (such as the tongue, teeth, pharynx, jaw and lips) are able to provide differences in vowel sounds, and produce significant changes in the formant frequencies. In other words, the different vowel sounds can be thought of as modifications to the vocal tract resonance. For example, the opening or closing of the mouth affects the resonance of the vocal tract cavity, as well as the length of the opening formed by the articulators, as shown in FIG. 1. The tongue is an example of an articulator that can lengthen or shorten the vocal tract cavity.

Formants are distinctive frequency components of the acoustic signal produced by speech. By specifying peaks in the amplitude or frequency spectrum, the information that people require to distinguish between speech sounds can be represented quantitatively. The formant with the lowest frequency is called $F_1$, the second $F_2$, and the third $F_3$. Most often the two first formants, $F_1$ and $F_2$, are sufficient to identify the vowel. Formants may be defined by their frequency and by their spectral width. In other words, vocal tract resonances ($R_i$) give rise to peaks in the output spectrum ($F_i$).

For a typical adult person, $R_1$ will usually be between 200-800 Hz. The low end of the range would be realized for vowel pronunciation that requires a small opening of the mouth, whereas the high end of the range typically would be the case with a larger opening of the mouth. The second resonance is typically in the range of 800-2000 Hz. Again, these values vary depending on the vowel pronounced. For example, the vowel /u/ requires a small opening of the mouth, so for a given speaker, $R_2$ may be lower than 800 Hz (e.g., 500 Hz would not be uncommon). On the other hand, vowels such as /i/ require a large opening of the mouth, so for a given speaker, $R_2$ may be higher than 800 Hz (e.g., 2000 Hz would not be uncommon). As discussed, the articulators (such as the tongue, teeth, pharynx, jaw and lips) are able to provide differences in vowel sounds, and produce significant changes in the formant frequencies.

The distortion and muffling of the speech of a face mask user can come from two primary sources: (1) blocking of the speech sounds from the mouth and/or nose, and (2) distortion and muffling of the speech sounds from the mouth and/or nose caused by the face mask.

The second aspect of speech distortion, the modifying or distortion of the speech as it is emitted from the mouth and nose, is caused by the acoustic coupling of the face mask to the vocal tract as well as by resonances (and antiresonances) generated in the mask itself. While most people think that the reduced speech intelligibility caused by wearing a mask is due to the first source (blocking of the speech sounds), the second source (distortion and muffling) is actually the predominant cause.

The vowels in speech are largely determined for the listener by the frequency and damping of the lowest 2 or 3 vocal tract resonances, and primarily the lowest two resonances. These resonances also partially determine the consonants perceived. The primary vocal tract resonances are termed the formants of the vocal tract, with the term "vocal tract," or "supraglottal vocal tract" referring to the chambers of the mouth and pharynx above the laryngeal voice source.

When estimating the distortion of the speech produced with a mask, a comparison of the spectrum of the speech with and without the mask that includes an estimation of change in formant structure caused by the mask has an advantage over subjective testing of speech intelligibility in that it can yield repeatable objective measures of the muffling of the speech in a short amount of time.

There are a number of methods used for measuring the frequency and damping of the speech formants. In mathematical terms, a formant is a resonance, defined by a frequency and a damping factor or alternatively, in some descriptions of vocal tract acoustics, a formant is described as a peak in the spectrum of the speech and a center frequency and a bandwidth of that peak. These are alternative descriptions. The bandwidth, nominally, the distance in Hz between the −3 dB points preceding and following the peak, can be mathematically derived from the damping factor, and vice versa.

Also, in some applications, a formant is identified by only its frequency. It is only the frequency of a formant that is identified by a spectrographic analysis.

Figure 2:
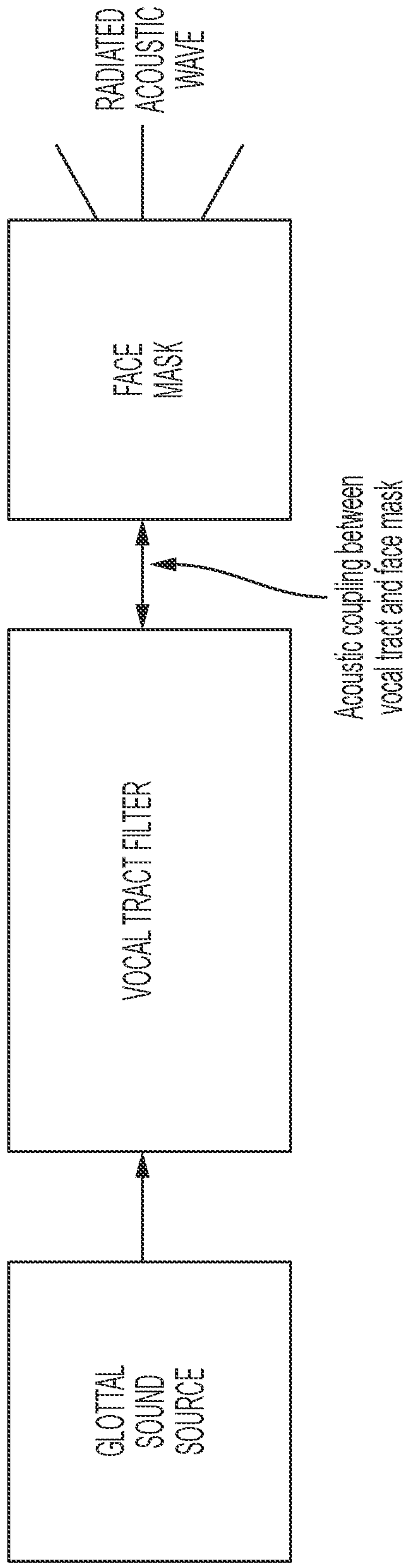
FIG. 2 shows an illustration of the glottal sound source coupling with the vocal tract filter and face mask.
Figure 3:
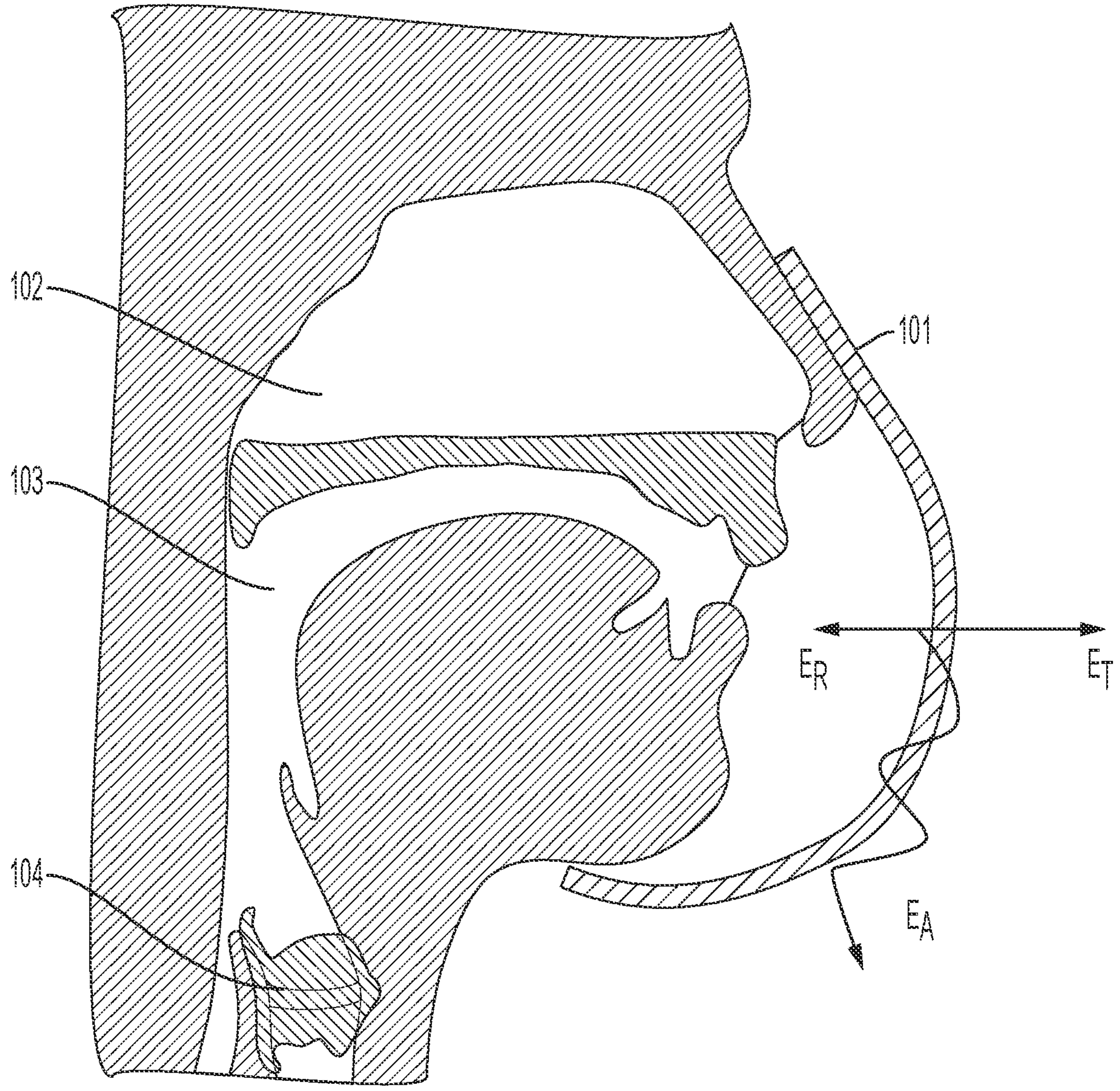
FIG. 3 shows a physical depiction of the glottal sound source coupling with the vocal tract filter and face mask.

As further explained by the experiments shown below, when a face mask is worn on a face, there is a shifting in the frequency in the formants and/or a damping of the formants of the speech emitted from the mouth and nose caused by the acoustic coupling of the mask chambers to the chambers of the mouth and nose, so as to cause a reduction in the intelligibility of the speech. In other words, the natural chamber of the vocal tract produces formants of the voice, and when a face mask is worn, the chamber created over the mouth couples to the vocal chamber, and alters the formants. This effect is depicted in FIGS. 2 and 3. As illustrated in FIG. 2, the glottal sound source couples with the vocal tract filter. With the addition of a face mask, the resonances of the vocal tract filter couple to the face mask, as indicated by the double-arrow. FIG. 3 physically shows this concept. As shown, the vocal folds 104 form one end of the vocal tract 103. Additional resonances of the nasal cavity 102 are also required for nasal sounds (such as /m/, /n/, and /ng/). Without the mask wall 101, the resonances of the vocal tract 103 (and sometimes also the nasal cavity 102) would produce undistorted and unmuffled speech. As shown in FIG. 3, the addition of a mask wall 101 may cause the sound wave energy to behave in one of three ways as it exits the mouth: it may reflect sound energy ($E_R$), it may allow sounds energy to be transmitted ($E_T$), or it may absorb sound energy ($E_A$). The distortion and muffling caused by the face mask wall 101 is caused by the reflected sound energy ($E_R$). As a result, increasing the amount of transmitted sound energy ($E_T$) or absorbed sound energy ($E_A$) will reduce distortion and muffling caused by the face mask coupling to the vocal tract.

When worn, face masks result in a shifting in the frequency, an increase or decrease in the peaks of one or more formants, and/or the damping of the formants of speech emitted from the mouth and nose caused by the acoustic coupling of the mask chambers to the chambers of the mouth and nose (i.e., vocal tract and nasal cavity). In other words, the interior of the mask becomes acoustically part of the vocal tract. This lengthening of the effective vocal tract will tend to lower the formants, with the effect varying with the vowel being spoken. In the tract/mask acoustic system, the departure from the closed-to-open tube model can also add additional resonances and antiresonances to the transfer function, to further muffle the speech.

Figure 4B:
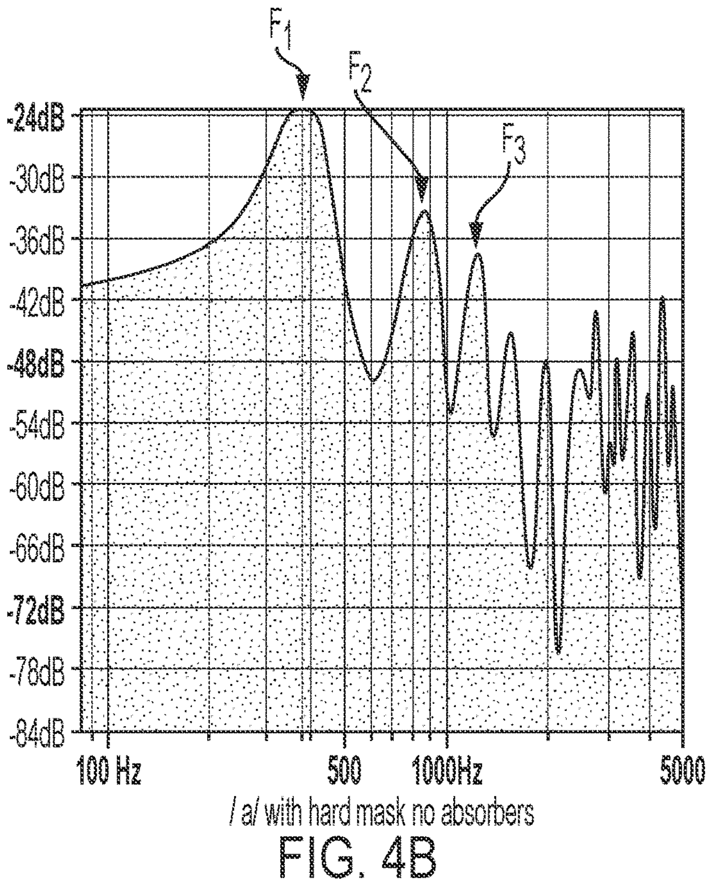
FIG. 4B shows an experimentally obtained spectrum voiced with a face mask that includes an air impervious face mask wall.
Figure 4A:
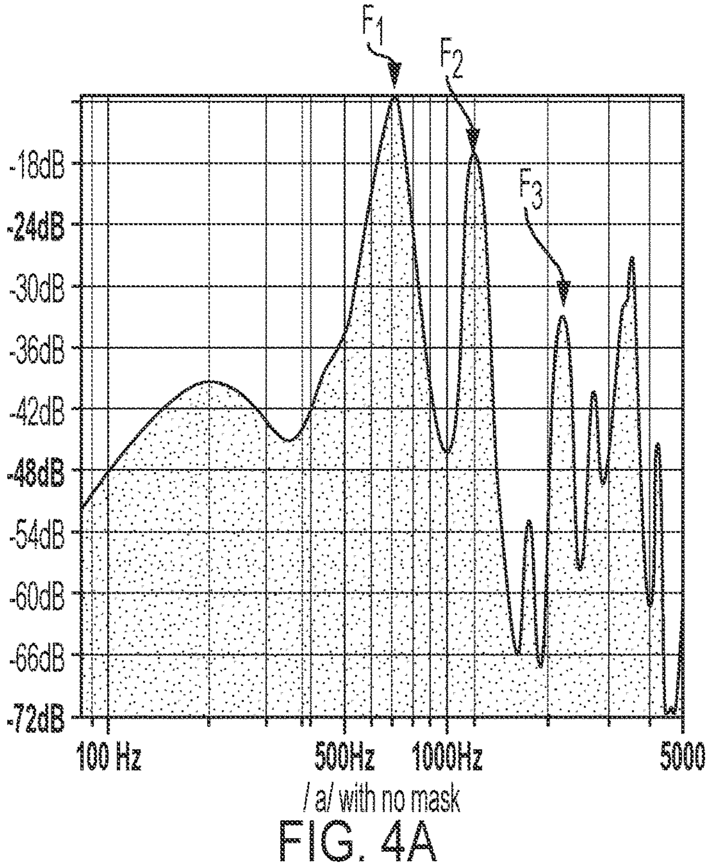
FIG. 4A shows an experimentally obtained spectrum voiced with no face mask.

Because most of the information in speech is conveyed by the frequency and damping of the lowest 2 or 3 formants in the speech, it is possible to evaluate the degree of distortion or muffling of the speech caused by the mask by comparing the formant structure of the speech with and without the mask, as in FIGS. 4A and 4B. Changes in formant structure caused by the face mask include a shifting of the frequency of one or more of the formants, an increase or decrease in the peaks of one or more formants, or a broadening or narrowing of one or more of the formant peaks, or a combination. The changes to the formant structure may also result in one or more additional resonances or antiresonances (spectral dips), which may not necessarily be a simple "shift" of one the three formants. For example, the coupling of a first formant of a human vocal tract with a certain face mask may cause a decrease in the formant (e.g., the face mask resonance results in less resonant energy in the first formant), which could be a result of formant energy simply dissipating as a result of the face mask, or the face mask could cause energy to transfer to another formant.

A broadening of one or more of the formant peaks is generally known as a "dampening" effect, which may also be accompanied be a decrease in base-to-peak amplitude of one or more of the formant peaks. The terms "distortion" and "muffling" are essentially synonymous in the art, in some applications "muffling" may be more associated with damping effects, while "distortion" may be more associated with shifting effects. As used here, "distortion" and "muffling" are synonymous and may refer to any changes in formant structure caused by the face mask.

While speech intelligibility is primarily determined by the first three formants, distortion or muffing may cause changes in only a single formant, multiple formants, or all formants. Additionally, different formants may be affected in different ways. For example, a particular mask may cause the first formant to see a shift, while the second formant is dampened, and the third formant is unaffected.

FIG. 4 shows an example of distortion and muffling caused by a face mask. The spectra were obtained from an omnidirectional microphone a few inches from the mouth with no mask, shown in FIG. 4A, and a face mask with an air impervious wall, shown in FIG. 4B. The vowel was an unnasalized /a/ as spoken by an adult male English speaker. Analysis was made using the freeware Audacity® Audio Editor.

The speaker attempted identical vowel /a/ sounds in each case, and the first three formants can be seen in both spectra, as labeled. FIG. 4A, shown on the bottom, shows a spectrum with no mask. In this case, narrow-bandwidth peaks are at frequencies typical for the vowel /a/-$F_1$ is centered at about 710 Hz, $F_2$ is centered at about 1210 Hz, and $F_3$ is centered at about 2300 Hz. Distortion and muffling effects of the air impervious walled face mask are evident in the spectrum of FIG. 4B. As shown in FIG. 4B, all three formants shifted to lower frequencies—$F_1$ is now centered at about 380 Hz, $F_2$ is centered at about 880 Hz, and $F_3$ is centered at about 1200 Hz. This accounts for the deep sounding voice common among people wearing face masks. The formants peaks also became broader as a result of the mask, and shifted in amplitude.

The clear spectra in FIG. 4 were obtained by using a very low glottal pulse rate, in what is referred to as an ingressive vocalization. Optimum spectral clarity would be obtained using a single acoustic impulse stimulating the vocal tract. The use of impulses in analyzing acoustic and mechanical systems is well understood in other applications, but has not been applied to analyzing the distortion of speech caused by a mask.

Figure 5A:
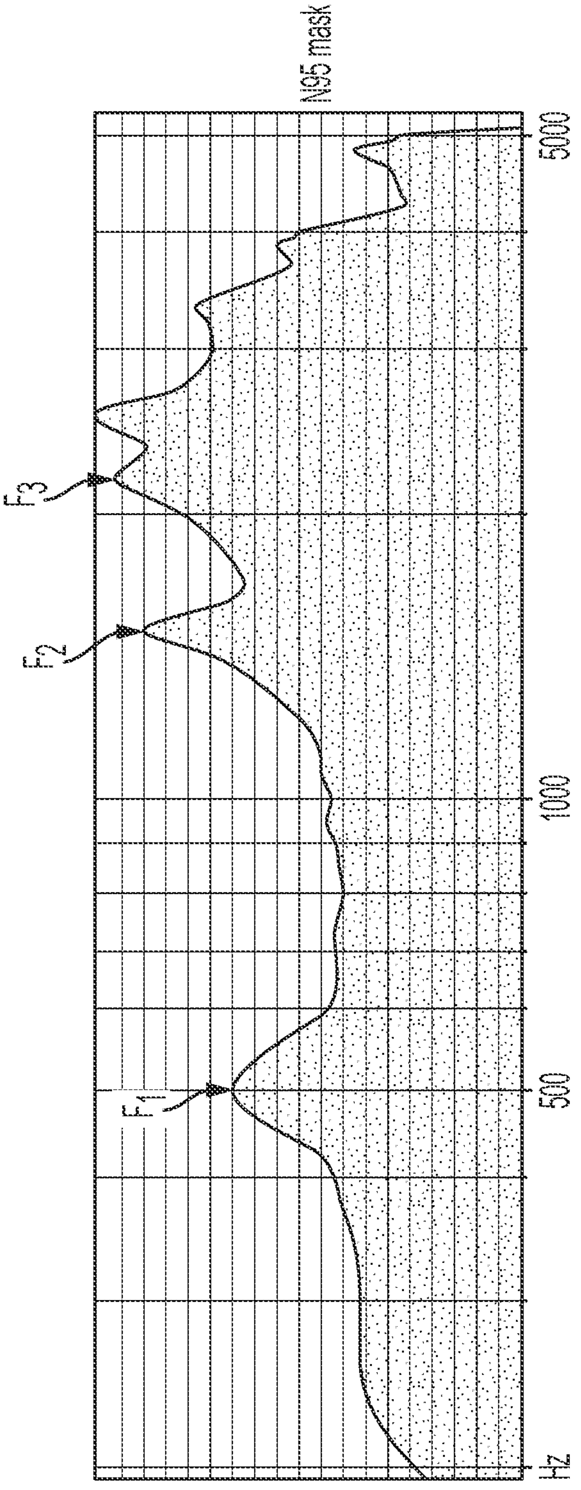
FIG. 5A shows an experimentally obtained spectrum voiced with a face mask that includes an air transmissive face mask wall.
Figure 5B:
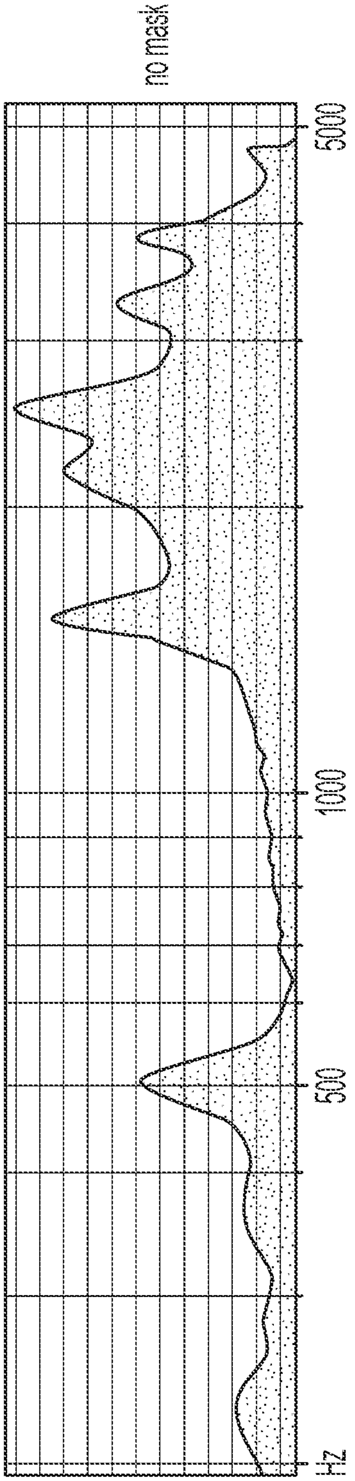
FIG. 5B shows an experimentally obtained spectrum voiced with no face mask.

FIG. 5 shows example of the distortion and muffling caused by a face mask with an air transmissive wall. Spectra were obtained suing the same instrumentation as FIG. 4, but an N95 face mask was used (Weini Technology K320t Niosh N95). As shown, this particular face mask resulted in the formants becoming weaker and more damped, as shown by the formant peaks broadening (becoming less narrow), and less pronounced (the formant peak amplitude is smaller when measured from the baseline in between formant peaks). This also agrees with the common quality of less pronounced sounds being perceived when a face mask is worn.

According to one embodiment of the invention, the formant energy at locations at the mask wall are absorbed in order to reduce distortion and muffling caused by a face mask. For example, a sound absorptive material may be placed within or on the inside of the mask wall. Absorptive materials reduce the coupling of the vocal tract resonances to the face mask chamber by absorbing sound energy at the face mask wall instead of reflecting the energy.

Sound absorption is most commonly characterized by an absorption coefficient (a), which is a ratio of absorbed to incident sound energy. Materials range from absorbing no incident sound energy ($\alpha$=0) to absorbing all incident sound energy ($\alpha$=1), which results in a perfect absorber. In reality, these are theoretical limits so $\alpha$ ranges between 0 and 1. Absorption coefficients vary with frequency. As a result, materials that absorb at one formant do not necessarily (and often do not) absorb at all formants. Absorbing materials should advantageously absorb over a broad range of frequencies. It should be noted when an absorption coefficient ($\alpha$) is used to reference a material, a refers to the theoretical absorption coefficient of the bulk materials, not the effective absorption coefficient of the acoustic face mask.

Any sound absorbing material may be used, such as foams, fiberglass, or sounds absorbing fabrics or coatings. Foams (such as acoustic polyurethane foam), sponges, and various fiberglass materials are most commonly used as sound absorbing materials, with fiberglass performing better at lower frequencies. Because the absorptive material reduces distortion and muffling by absorbing sound energy at the mask wall (thereby reducing the coupling of the vocal tract resonances to the face mask chamber), the more absorbing the material is, the more distortion and muffling will be reduced (all else being equal), with a perfect absorber being optimal (although a perfect absorber that comprises the entire inner surface of the face mask may unacceptably reduce audibility of the speaker).

Porous absorbers are particularly advantageous, such as foams, sponges, and other fiberglass materials known in the art of soundproofing. As one example, melamine foam (consisting of a formaldehyde-melamine-sodium bisulfite copolymer) is a foam-like material that is known in the art of soundproofing due to its due to its high sound absorption. These types of porous materials are known as a "open cell foam" porous absorbers. Porous materials present a larger amount of surface area to the advancing sound waves, and are effective absorbers because the oscillating air molecules inside the absorber lose their acoustical energy due to friction. Porous absorbers are highly effective sound absorbers across a broad range of medium-high frequencies, and are particularly advantageous because absorption generally increases with frequency until about 500 Hz, at which point absorption levels off. This absorption curve makes porous materials well-suited for acoustic face masks because, as discussed, the first formant of an adult is typically found at about 500 Hz. Porous absorbers naturally have low absorption coefficients below around 250 Hz, but these low frequencies carry little sound energy of the formants. Thin porous sheets mounted on a honeycomb structure are also known in the art. Various other foams and porous materials are known in the art of soundproofing, such as urethane and reticulated and partially reticulated foams. Porous materials are often fragile, and thus in some cases protective surfaces are required, such as sprayed-on materials (such as neoprene), perforated surfaces, membranes (such as plastic), or porous surfaces.

Additionally, materials may be made absorbing by microperforation or other structuring are particularly advantageous and have been shown to be effective at sound absorption. Perforated materials may also be effective absorbers through a similar way as porous absorbers: operating on the principle the oscillating air molecules penetrate the perforated material, the friction between the air in motion and the surface of the perforated material dissipates the acoustical energy. Micro-perforated absorbers have been shown to be effective absorbers over a relatively broad band of frequencies. For example, in Liu et al., "Acoustic properties of multilayer sound absorbers with a 3D printed micro-perforated panel." Appl. Acoust. 121, 25 (2017), showed that in addition to perforated absorbing structures (usually of the order of centimeters or millimeters), micro-perforated panel absorbers (sub-millimeter) can also be effective. In addition, further effective absorbing structures were shown by including a non-woven porous sound absorbing material. Perforation allows for the sound absorbing material to be much thinner than it otherwise would be. For example, in Liu, absorption was achieved with an absorber with a thickness of 1 mm, diameter of 29 mm, and hole diameter of 0.6 mm.

Acoustic metamaterials, and other crystal-based materials such as metasurfaces, sonic crystals, and phononic crystals have been shown to achieve very high (perfect or near perfect) absorption. For example, in Liu et al. (2000). "Locally Resonant Sonic Materials". Science. 289 (5485): 1734-1736, a two-cm slab of acoustic metamaterial comprising arrays of spheres (sonic crystals) absorbed sound that normally would require a much thicker material. The frequency of absorbed sound can be tuned by varying the size and geometry of the sonic crystal. As a result, muffling and distortion is reduced by tuning the acoustic metamaterial to one or more frequencies of the face mask chamber. The same tuning is achieved with other phononic crystals, as the principle is the same.

Sounds absorbing materials, such as acoustic foam and fiberglass, alter the sound waves so that resulting sound is clear and devoid of any noise or interference. This property is very important while recording music. Acoustic foam for soundproofing and enhancing is an open celled foam, and is particularly advantageous. This foam increases the air resistance, so that the amplitude of sound waves is reduced. As a result, the sound waves are attenuated. The energy released in the process is dissipated as heat. Fiberglass is made of very thin strands of glass. Insulation fiberglass is different from the one used for industrial purposes. Acoustic foam is available in uniform density. The higher the density of fiberglass, the better it is able to capture sound waves of lower frequencies.

In one embodiment, a sound absorbing member may be connected to the face mask wall in order to absorb sound waves incident on the mask wall, reducing the resonance created by the face mask, and reducing the coupling of the vocal tract to the face mask, and thus reducing the distortion and muffling caused by the face mask. In the embodiment shown in FIG. 6, a sound absorbing member 202 may be inserted into the face mask wall 201, for example, by cutting out a portion of the face mask wall and inserting the sound absorbing member. In other embodiments, the sound absorbing member 202 may be inserted by other suitable method, for example by layering the sound absorbing member 202 into the mask wall 201. According to yet other embodiments, the sound absorbing member 202 may be inserted into the mask wall 201 during manufacture of the mask wall material, for example, by depositing (for example, an acoustic coating such as mass loaded vinyl), pressing, spraying (for example, a sound deadening spray), painting (for example, a sound deadening paint such as Acousti-coat paint or sound absorbing fillers and resins) or otherwise forming or applying the absorptive member 202 into the material of the mask wall 201.

It should be noted that the term "member," as used here, may refer to any discrete element that is distinct from the face mask wall and is not limited to any particular size or shape. For example, an absorbing member, in a particular embodiment, may be a foam disk, as described above. In other embodiments, the absorbing member may be a layer of other absorbing material. This layer is considered a member because the layer is distinct from the mask wall, even if the layer is integrated or ingrained in the mask wall. As another example, an absorbing coating or spray is also an absorbing member because the absorbing particles can be discretely identified from the original mask wall.

Figure 6:
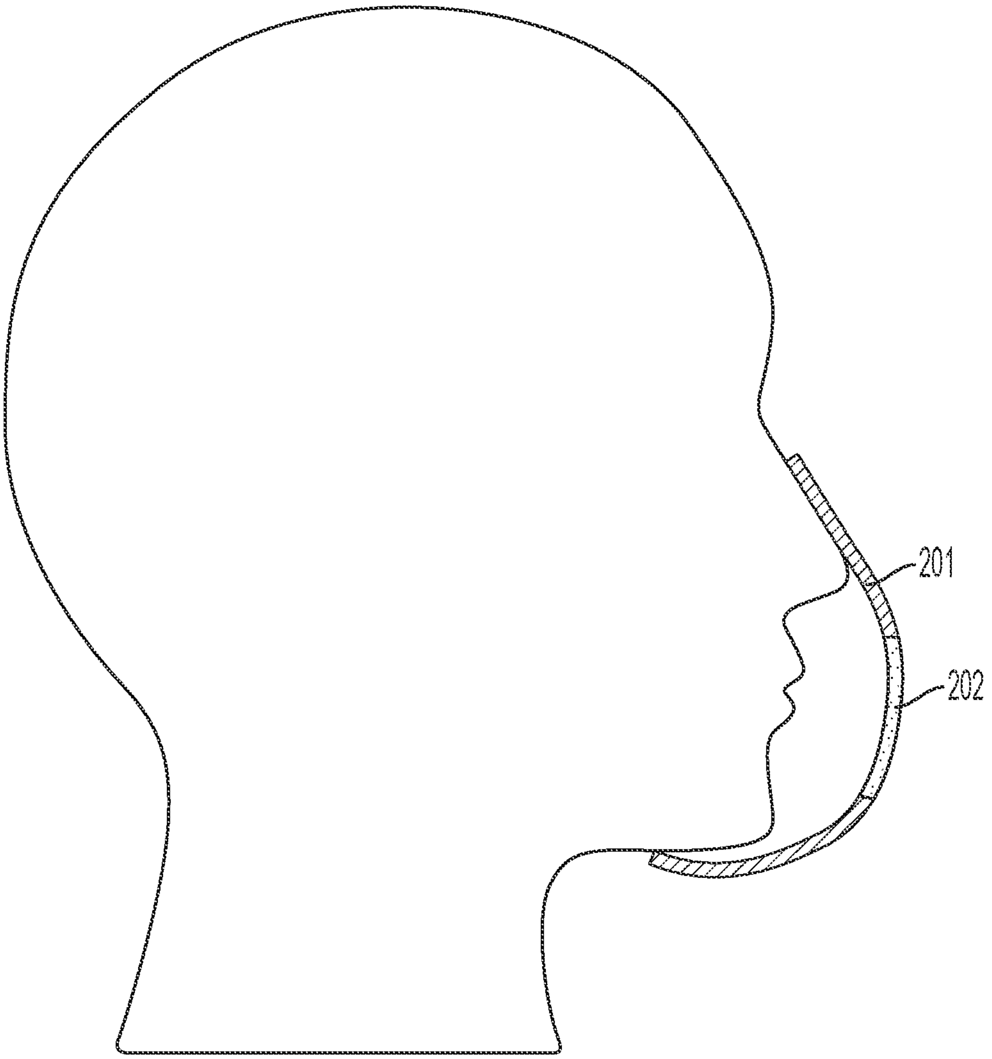
FIG. 6 shows a profile view of an embodiment of an acoustic face mask.

The absorptive member 202 should be advantageously be located close to the mouth such that more sound waves are incident upon the sound absorbing member 202. In addition, the absorptiveness of the sound absorbing member 202 is roughly proportional to the surface area occupied by the sound absorbing member 202 that is incident with sound waves. Thus, in some embodiments, a plurality of sound absorbing members 202 may be used. In the embodiment of FIG. 6, the mask wall 201 may be comprised of an air transmissive material, and therefore is no ventilation valve is required.

The size and shape of the absorbing member can also maximize its absorptive qualities. In general, a thicker absorbing member will absorb more sound energy. In one embodiment, the thickness of the absorbing member is tailored such that the thickness is one-quarter of the wavelength of the sound wave, which results in the reflected wave being shifted by a phase shift of $\pi$ from the incident wave. In this case, the incident sound wave helps to cancel the reflected wave. The wavelength of the sound wave is given as $\lambda=c/f$, where c is the speed of sound (343 m/s at 20° C.) and f is the frequency.

In the case of porous sound absorbing members, a general rule is that the thickness of the absorbing member increases with thickness, and begins to achieve high absorption ($\alpha>0.8$) at about one tenth of the wavelength. At 500 Hz, this translates to about 6.8 cm using the above equation. Because the sound absorbing member also attenuates the reflected wave, the sound absorption of a porous sound absorbing member is very effective at thicknesses as small as about 3-4 cm. For less demanding applications, effective absorption of a 500 Hz formant ($\alpha>0.5$) can be achieved with porous materials of lower thicknesses, such as 0.5-2 cm. Furthermore, because 500 Hz is typically the first formant, if absorption of the second or third formant is desired, thinner porous absorbing members may be used. For example, for a formant at 2000 Hz, the above thicknesses may be reduced by a factor of 4.

Perforated materials may be much thinner, often achieving high absorption at thicknesses on the order of millimeters, even as low as about 0.5-2 mm. The diameter of the holes are typically less than 1 millimeter, typically 0.05 to 1 mm, depending on the microperforation process.

It should be noted that in embodiments where the mask wall 201 is required to filter antigens at a certain quantitative metric required by the FDA (such as N95 face masks), certain configurations of the embodiment of FIG. 6 may be required to obtain FDA approval because the insertion of the sound absorbing member 202 may affect the ability of the mask wall 201 to filter antigens. For example, where the sound absorbing member 202 is inserted into the mask wall 201 by cutting out a portion of the mask wall 201, the sound absorbing member 202 connects with the mask wall 201 at its edges. This sealing may affect the ability of the mask to filter antigens, and thus may require FDA approval.

Figure 7:
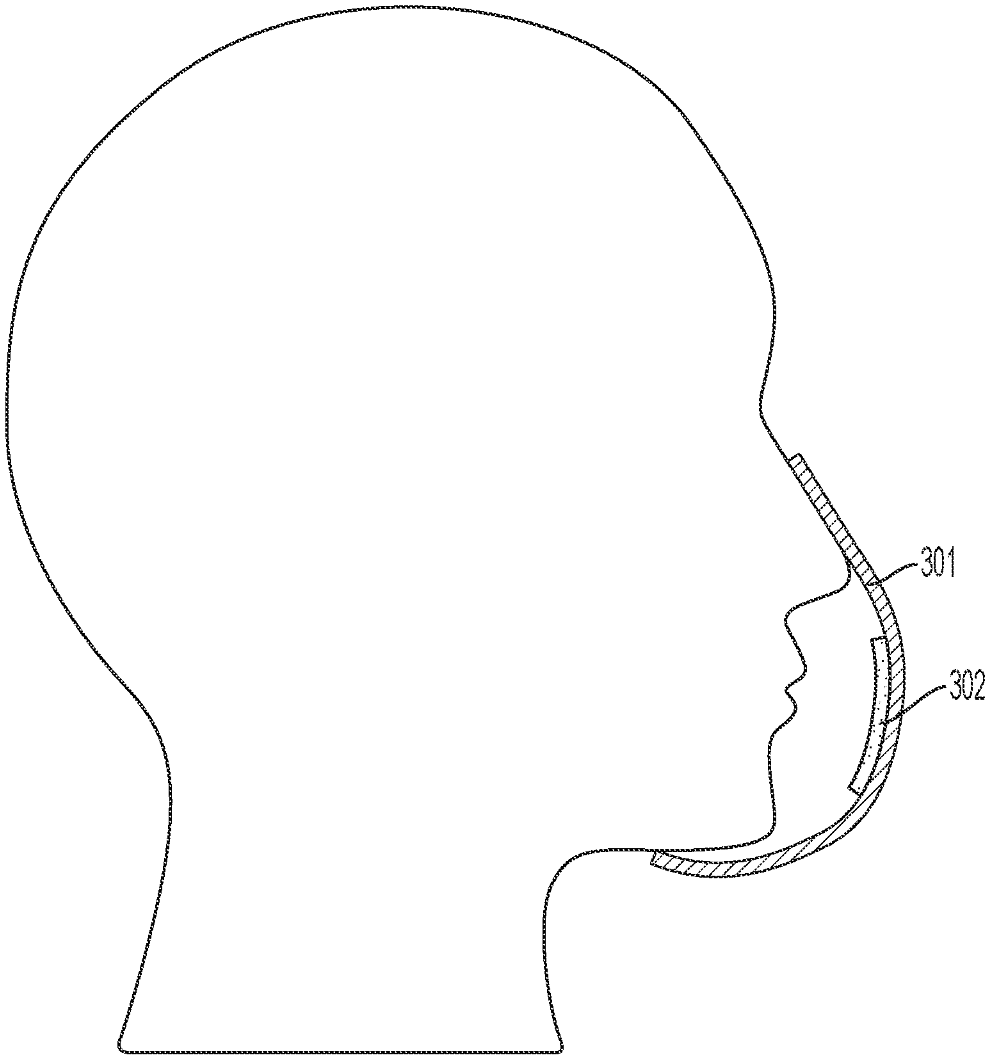
FIG. 7 shows a profile view of an embodiment of an acoustic face mask.

FIG. 7 shows an embodiment where sound absorbing member 302 is connected to the mask wall 301 by adhering the sound absorbing member 302 on the inner surface of the mask wall 301. Any method may be used to connect the sound absorbing member 302 to the inner surface of the mask wall 301, so long as the adhesive strength is sufficient. The sound absorbing member 302 may be adhered to the mask wall during or after manufacture of the mask wall 301. For example, by depositing (for example, an acoustic coating such as mass loaded vinyl), pressing, spraying (for example, a sound deadening spray), painting (for example, a sound deadening paint such as Acousti-coat paint or sound absorbing fillers and resins) or otherwise forming or applying the absorptive member 302 onto the material of the mask wall 301 either during or after manufacture of the mask wall 301.

Figure 8:
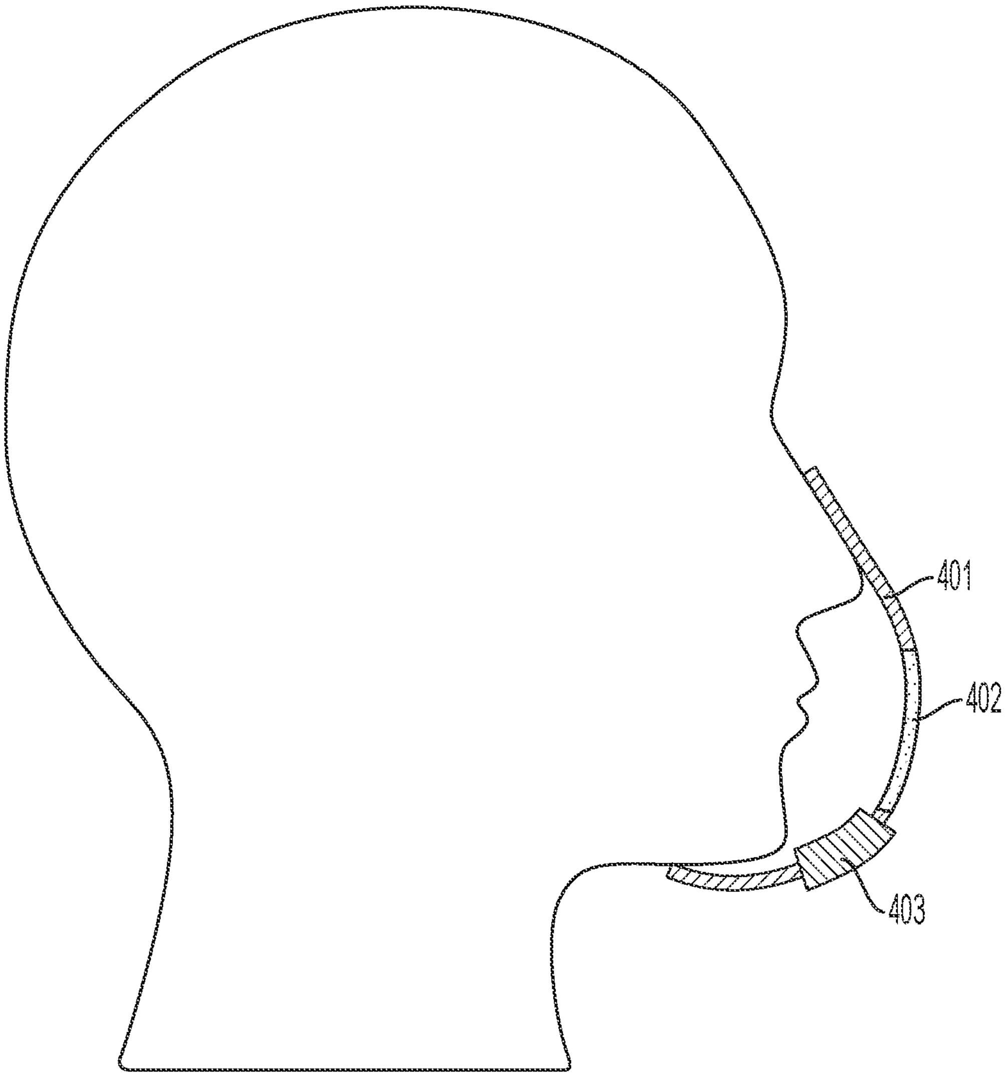
FIG. 8 shows a profile view of an embodiment of an acoustic face mask.

FIG. 8 shows an embodiment that additionally comprises a ventilation valve 403, in addition to sound absorbing member 402 inserted into the mask wall 401. In this embodiment, mask wall 401 may be comprised of an air impervious material, which necessitates the need for ventilation valve 403. In certain embodiments, the sound absorbing member 402 may be inserted into or otherwise connected to the ventilation valve 403. For example, sound absorbing member 402 may be comprised of an air transmissive material that would allow air to pass through the ventilation valve 403, but would also absorb incident sound waves. This configuration simplifies the design by reducing the alterations to the mask wall 401, as the sound absorbing member 402 and ventilation valve 403 comprise the same alteration.

Figure 9:
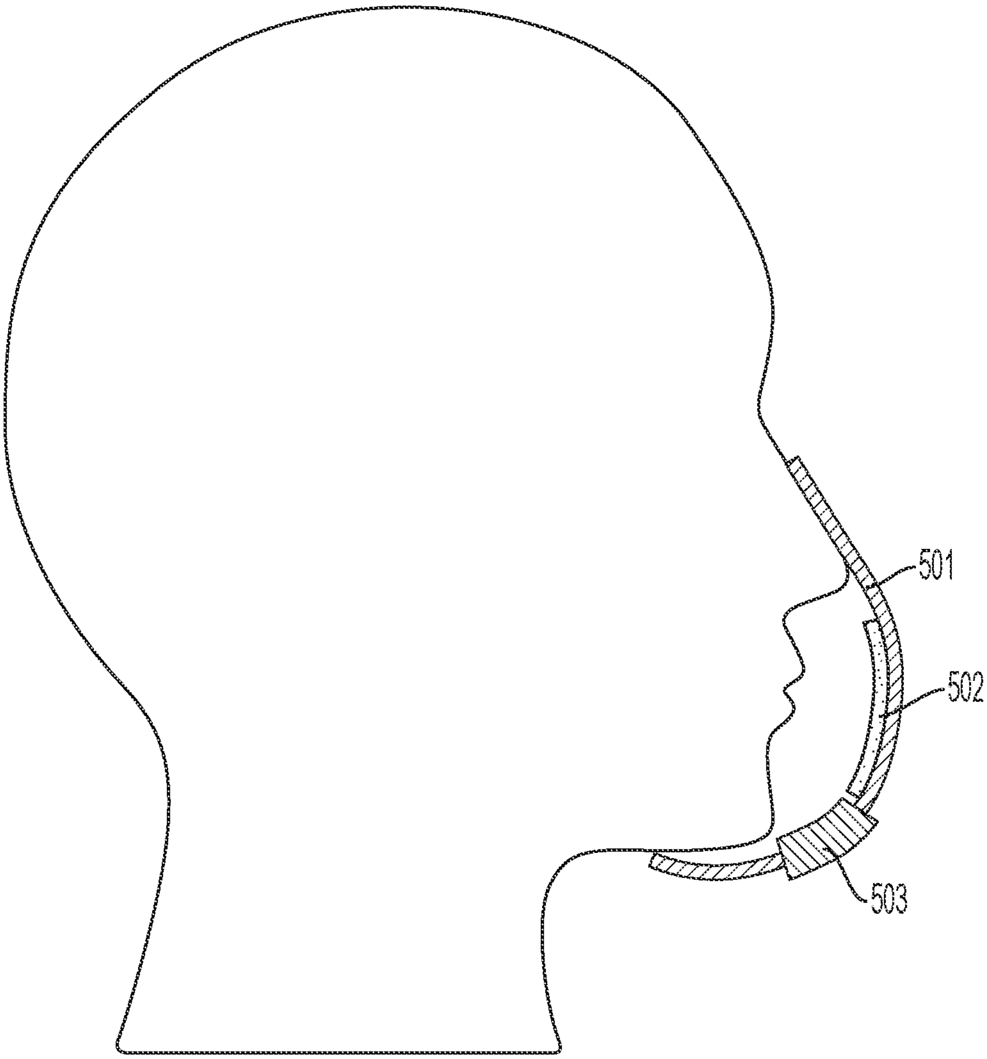
FIG. 9 shows a profile view of an embodiment of an acoustic face mask.
Figure 10:
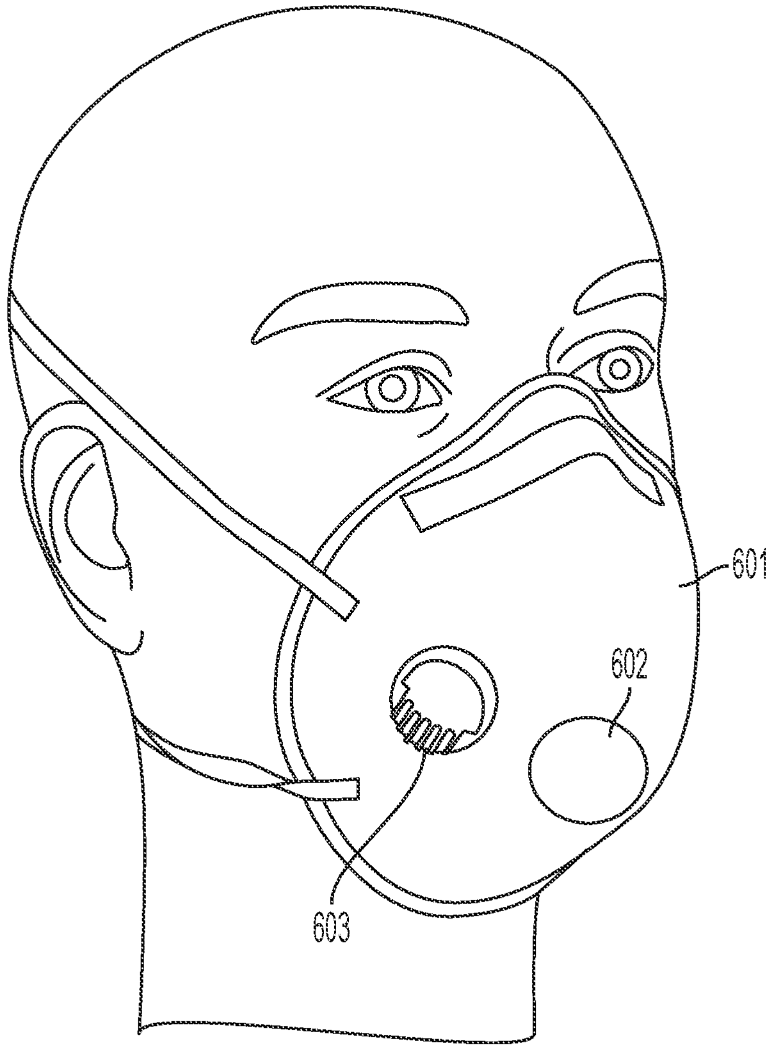
FIG. 10 shows a front perspective view of an embodiment of an acoustic face mask.
Figure 11:
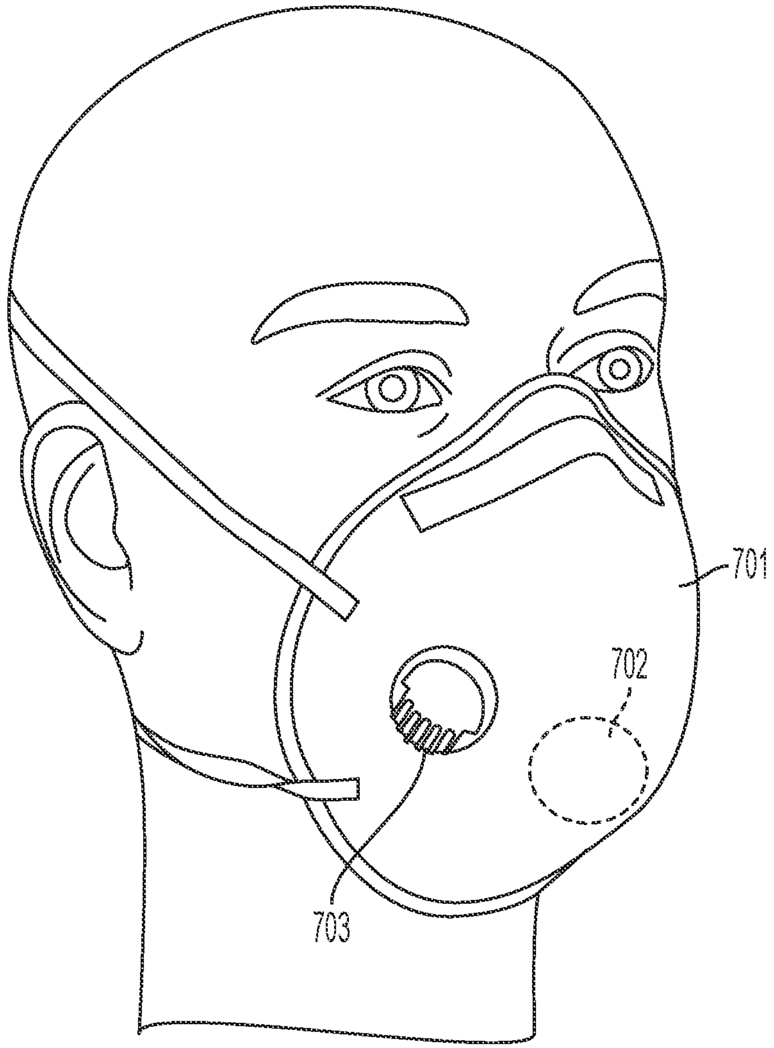
FIG. 11 shows a front perspective view of an embodiment of an acoustic face mask.
Figure 12:
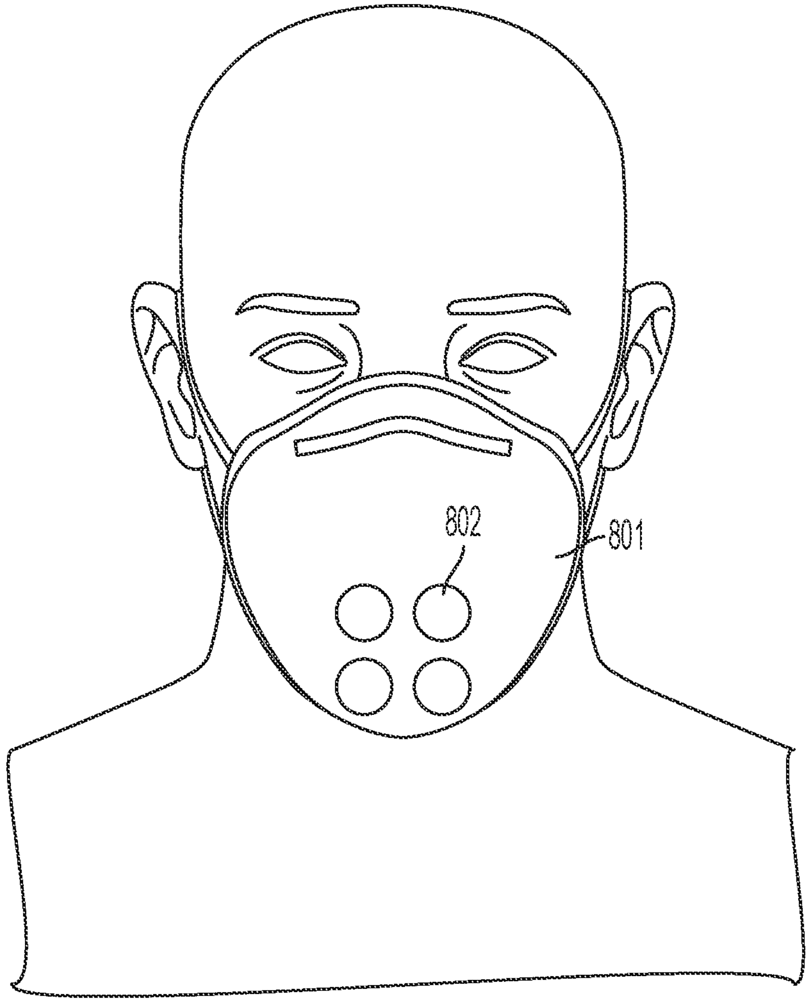
FIG. 12 shows a front perspective view of an embodiment of an acoustic face mask.

FIG. 9 further shows an embodiment that additionally comprises a ventilation valve 503, in addition to sound absorbing member 502 on the inner surface of the mask wall 501. FIG. 10 additionally shows sound absorbing member 602 and ventilation valve 603. In FIG. 11, the sound absorbing member 702 is disposed on the inside of the face mask wall 701. As shown in FIG. 12, a plurality of sound absorbing members 802 may provide additional reduction in distortion and muffling. FIG. 12 shows four sound absorbing members, but any number may be used.

Experimental results confirmed the reduction in distortion and muffling when sound absorptive members were connected to the mask wall, which results in an improvement in speech Intelligibility. While counterintuitive to use sound absorbing materials to improve speech Intelligibility, the blocking of sound waves by the absorbing member was greatly offset by the reduction in distortion and muffling, which resulted in a substantial overall increase in speech Intelligibility. Results confirmed reduced distortion and muffling in both air transmissive and air impervious mask wall embodiments.

Figure 13C:
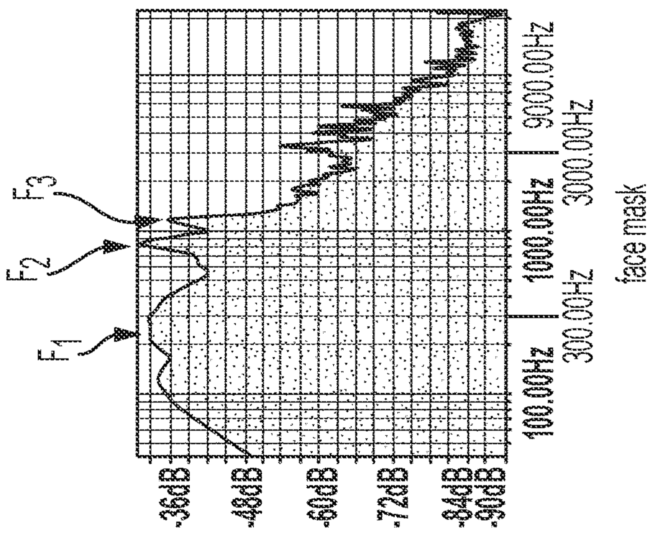
FIG. 13C shows an experimentally obtained spectrum voiced with a face mask without any sound absorbing member inserted into the face mask wall.
Figure 13B:
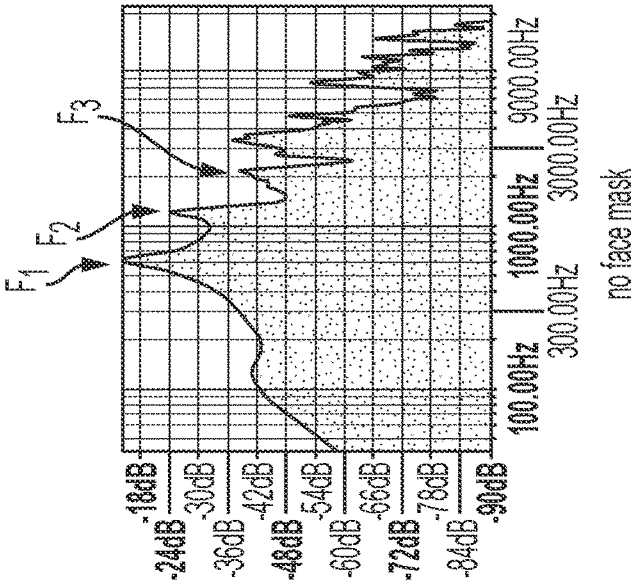
FIG. 13B shows an experimentally obtained spectrum voiced with no face mask.

As one illustrative example, the results obtained in FIG. 13. FIG. 13B shows a formant spectrum of a spoken ingressive vowel /a/ with no face mask. As shown, the first formant is centered at 620 Hz, the second and third formants are centered at 1200 Hz and 2200 Hz, respectively. The first and second formants are clearly defined, while the third formant is less defined. FIG. 13C shows a formant spectrum of the same spoken ingressive vowel /a/ with a face mask. As shown, the first formant has shifted to a lower frequency of about 300 Hz and the second formant has shifted to a lower frequency of about 850 Hz, and the third formant has shifted to a lower frequency of about 1250 Hz. The shift of formants to a lower frequency by a face mask often cause the distortion and muffling towards a lower ("boomy") sounding voice. FIG. 13C also shows that the face mask resulted in a dampening of the first formant, causing it to broaden and become less defined.

Figure 13A:
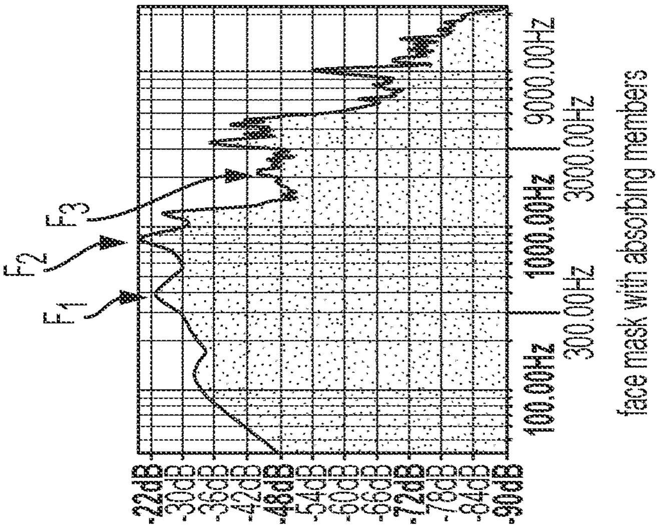
FIG. 13A shows an experimentally obtained spectrum voiced with an embodiment of the acoustic face mask that includes sound absorbing members inserted into the face mask wall.

FIG. 13A shows a formant spectrum when four sound absorbing members (as shown in FIG. 12) were inserted into the face mask of 13C. As shown, the first formant has shifted back to a higher frequency of 400 Hz. The first formant also became more defined. These two changes reduced the effects of distortion and muffling caused by the face mask. In other words, the sound absorbing members caused the formant spectrum of 13A to lessen (or "undo") at least one of the changes in the formant spectrum cause by the face mask (e.g., changes in the formant spectrum when comparing 13B to 13C). Four out of four listeners qualitatively agreed that the sound absorbing members improved speech intelligibility when compared to the face mask without sounds absorbing members (as shown in FIG. 13C). It should be noted that when a face mask causes the first or second formants (or both) to dampen or shift to lower frequencies, the first or second formants shifting even a small fraction back towards higher frequencies and lessening the effects of dampening greatly improves speech intelligibility.

Figure 14A:
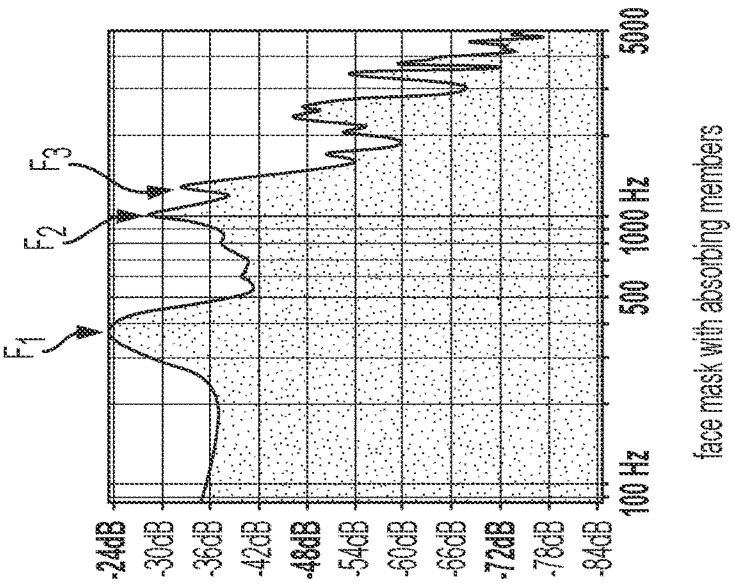
FIG. 14A shows an experimentally obtained spectrum voiced with an embodiment of the acoustic face mask that includes sound absorbing members inserted into the face mask wall.
Figure 14B:
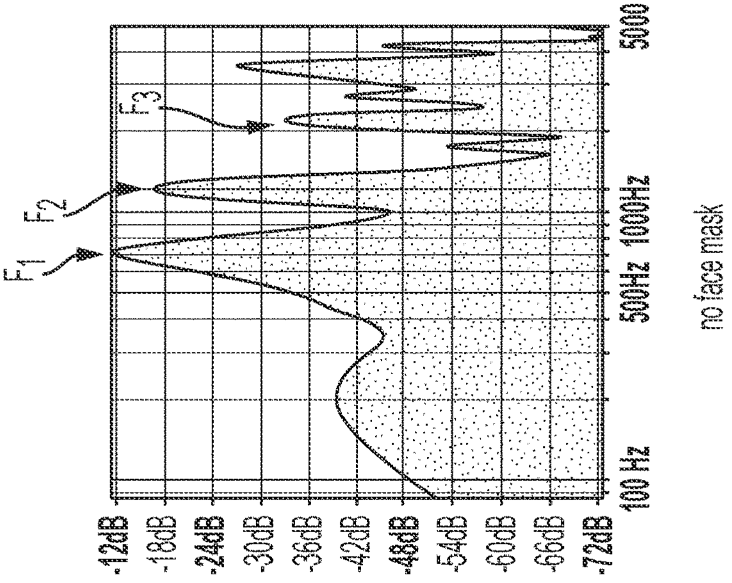
FIG. 14B shows an experimentally obtained spectrum voiced with no face mask.
Figure 14C:
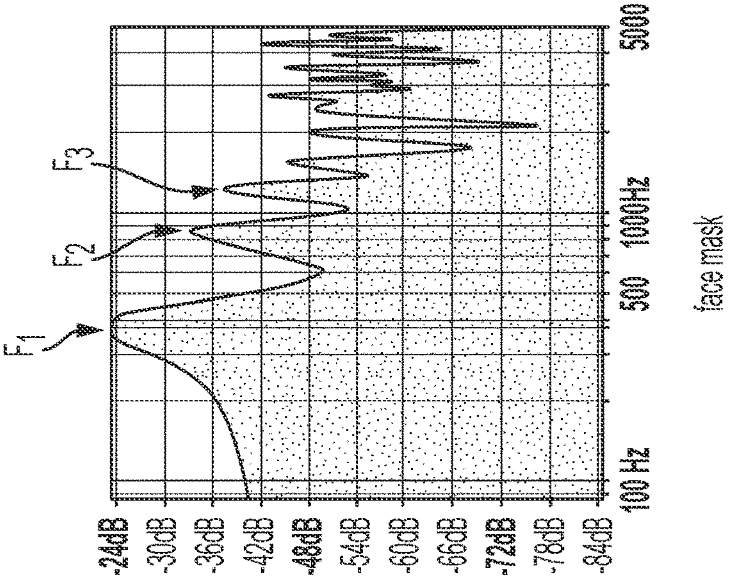
FIG. 14C shows an experimentally obtained spectrum voiced with a face mask without any sound absorbing member inserted into the face mask wall.

FIG. 14 shows another illustrative example of the reduction of distortion and muffling caused by a face mask by inserting 1 sound absorbing member. FIG. 14B shows a formant spectrum of a spoken ingressive vowel /a/ with no face mask. As shown, the first formant is centered at 710 Hz, the second and third formants are centered at 1210 Hz and 2300 Hz, respectively. The first, second, and third formants are clearly defined, with the first formant showing a large peak amplitude of about 34 dB. FIG. 14C shows a formant spectrum of the same spoken ingressive vowel /a/ with a face mask. As shown, the first formant has shifted to a lower frequency of about 380 Hz and the second formant has shifted to a lower frequency of about 880 Hz, and the third formant has shifted to a lower frequency of about 1200 Hz. FIG. 14C also shows that the face mask resulted in a dampening of all three formants, causing them to broaden and become less defined, and reducing the amplitude of the formant peaks.

FIG. 14A shows a formant spectrum when four sound absorbing members (as shown in FIG. 12) were inserted into the face mask of 14C. As shown, the first formant was largely unchanged, while the second formant shifted back to a higher frequency of 1015 Hz and the third formant shifted slightly back to a higher frequency of 1280 Hz. These two shifts reduced the effects of distortion and muffling caused by the face mask by shifting the first and second formants to shift back towards the spectrum of FIG. 14B (with no face mask). Four out of four listeners qualitatively agreed that the sound absorbing members improved speech intelligibility when compared to the face mask without sounds absorbing members (as shown in FIG. 14C).

Instead of sound absorbing members, similar distortion and muffling reducing results are obtained with sound transparent members. Just as absorbing materials reduce coupling of the vocal tract resonances to the face mask chamber by absorbing sound energy at the face mask wall instead of reflecting such energy, transparent materials reduce coupling of the vocal tract resonances to the face mask chamber by allowing sound energy at the face mask wall to pass instead of reflecting such energy. The reduction in reflection of sounds energy is the common factor, as the reflected sound waves are the primary cause of the coupling of the vocal tract resonances to the face mask chamber. For example, acoustically transparent fabrics and woven materials may be used. These materials are known in the art of projection screens, which use woven fabrics to allow the sound source to be placed behind the screen such that a listener in front of the screen is able to hear the sound source with little to no distortion and muffling after passing through the projection screen.

Thus, specific apparatus for acoustic face masks have been disclosed. It should be apparent, however, to those skilled in the art that many more modifications besides those already described are possible without departing from the inventive concepts herein. The inventive subject matter, therefore, is not to be restricted except in the spirit of the disclosure. Moreover, in interpreting the disclosure, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

What is claimed is:

1. An acoustic face mask comprising:

a face mask wall configured to cover at least a person's mouth, thereby forming a face mask chamber; and a sound absorbing member connected to said face mask wall, wherein the sound absorbing member comprises a porous material, wherein the sound absorbing member is configured to reduce the acoustic coupling of a person's vocal tract to the face mask chamber by reducing the sound energy reflected by the face mask wall.

2. The acoustic face mask of claim 1, wherein the porous material comprises a foam;

wherein the sound absorbing member reduces distortion and muffling of speech sounds caused by the face mask wall, as perceived at a location outside of the face mask wall;

wherein the sound absorbing member is adhered to the inner surface of the face mask wall; and wherein the face mask wall comprises a filter, wherein the filter is configured to filter one or more airborne particles.

3. The acoustic face mask of claim 1, wherein the sound absorbing member is inserted into the face mask wall.

4. The acoustic face mask of claim 1, wherein the sound absorbing member is adhered to the inner surface of the face mask wall.

5. The acoustic face mask of claim 1, wherein the sound absorbing member is layered into the face mask wall.

6. The acoustic face mask of claim 1, wherein the sound absorbing member is deposited, pressed, sprayed, painted, or otherwise formed on or applied to the face mask wall.

7. The acoustic face mask of claim 1, wherein the sound absorbing member reduces distortion and muffling of speech sounds caused by the face mask wall, as perceived at a location outside of the face mask wall.

8. The acoustic face mask of claim 1, wherein the sound absorbing member reduces distortion and muffling of speech sounds as perceived at a location outside of the face mask wall, and wherein the speech sounds are spoken by the person's mouth.

9. The acoustic face mask of claim 1, wherein the sound absorbing member reduces a frequency shift of one or more formants of speech sounds or reduces a dampening, broadening, or change in amplitude of one or more formants of speech sounds, wherein the frequency shift or dampening, broadening, or change in amplitude is caused by the face mask wall.

10. The acoustic face mask of claim 1, wherein the porous material comprises a foam.

11. The acoustic face mask of claim 1, wherein the porous material comprises a melamine foam.

12. The acoustic face mask of claim 1, wherein the sound absorbing member is perforated.

13. The acoustic face mask of claim 1, wherein the face mask wall comprises a filter, wherein the filter is configured to filter one or more airborne particles.

14. The acoustic face mask of claim 13, wherein the one or more airborne particles comprises one or more airborne pathogen particles.

15. The acoustic face mask of claim 1, wherein the sound absorbing member is adhered to the inner surface of the face mask wall; and wherein the face mask wall comprises a filter, wherein the filter is configured to filter one or more airborne particles.

16. The acoustic face mask of claim 1, wherein the porous material comprises a foam; and wherein the sound absorbing member reduces distortion and muffling of speech sounds caused by the face mask wall, as perceived at a location outside of the face mask wall.

17. A method for fabricating an acoustic face mask, comprising:

providing a face mask wall configured to cover at least a person's mouth, thereby forming a face mask chamber; and connecting a sound absorbing member to said face mask wall, wherein the sound absorbing member comprises a porous material, wherein the sound absorbing member is configured to reduce the acoustic coupling of a person's vocal tract to the face mask chamber by reducing the sound energy reflected by said face mask wall.

18. The method of claim 17, wherein the sound absorbing member is adhered to the inner surface of the face mask wall; and wherein the face mask wall comprises a filter, wherein the filter is configured to filter one or more airborne particles.

19. The method of claim 17, wherein the porous material comprises a foam; and wherein the sound absorbing member reduces distortion and muffling of speech sounds caused by the face mask wall, as perceived at a location outside of the face mask wall.

20. The method of claim 17, wherein the sound absorbing member is perforated.

21. The method of claim 17, wherein the porous material comprises a foam.

22. The method of claim 17, wherein the porous material comprises a foam;

wherein the sound absorbing member reduces distortion and muffling of speech sounds caused by the face mask wall, as perceived at a location outside of the face mask wall;

wherein the sound absorbing member is adhered to the inner surface of the face mask wall; and wherein the face mask wall comprises a filter, wherein the filter is configured to filter one or more airborne particles.

* * * * *